(12) United States Patent
Lofland et al.

(10) Patent No.: US 9,059,987 B1
(45) Date of Patent: *Jun. 16, 2015

(54) METHODS AND SYSTEMS OF USING SINGLE SIGN-ON FOR IDENTIFICATION FOR A WEB SERVER NOT INTEGRATED WITH AN ENTERPRISE NETWORK

(71) Applicant: Sprint Communications Company L.P., Overland Park, KS (US)

(72) Inventors: Bruce Lofland, Lenexa, KS (US); Eric E. Miller, Overland Park, KS (US); Joao Tex Teixeira, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/857,144

(22) Filed: Apr. 4, 2013

(51) Int. Cl.
*G06F 21/41* (2013.01)
*G06F 15/16* (2006.01)
*H04L 29/06* (2006.01)

(52) U.S. Cl.
CPC ............................. *H04L 63/0815* (2013.01)

(58) Field of Classification Search
USPC .......... 713/168–174, 182–186, 202; 709/206, 709/225, 229, 249, 389; 726/2–8
See application file for complete search history.

(56) References Cited

U.S. PATENT DOCUMENTS

| | | | |
|---|---|---|---|
| 5,293,488 A | 3/1994 | Riley et al. | |
| 5,659,547 A | 8/1997 | Scarr et al. | |
| 5,742,668 A | 4/1998 | Pepe et al. | |
| 5,742,905 A | 4/1998 | Pepe et al. | |
| 5,991,882 A | 11/1999 | O'Connell | |
| 6,009,177 A | 12/1999 | Sudia | |
| 6,205,478 B1 | 3/2001 | Sugano et al. | |
| 6,240,512 B1 | 5/2001 | Fang et al. | |
| 6,321,334 B1 | 11/2001 | Jerger et al. | |
| 6,471,486 B1 | 10/2002 | Centers et al. | |
| 6,519,647 B1 | 2/2003 | Howard et al. | |
| 6,609,115 B1 | 8/2003 | Mehring et al. | |
| 6,816,871 B2 | 11/2004 | Lee | |
| 6,836,799 B1 | 12/2004 | Philyaw et al. | |
| 6,898,577 B1 | 5/2005 | Johnson | |
| 7,016,875 B1 | 3/2006 | Steele et al. | |

(Continued)

OTHER PUBLICATIONS

Allababidi, Mouaz, et al., "Integrated User Profile Administration Tool", filed Apr. 13, 2006, U.S. Appl. No. 11/403,619.

(Continued)

*Primary Examiner* — Evans Desrosiers

(57) ABSTRACT

A method for accessing, using an authentication system, an application server within an enterprise network is disclosed. The method comprises retrieving an authentication message comprising a user name, wherein the authentication system is associated with the application server. The method comprises determining that a login account is not stored in a data store of the authentication system, wherein the login account is associated with a user identification and comprises a user name that matches the user name of the authentication message. The method comprises retrieving a login account from a user data store to generate a login account in the data store associated with the authentication system, wherein the login account is associated with the user name. The method comprises authenticating the user name with the login account. The method comprises providing to a user associated with the user name, access based on the authentication to the project server.

18 Claims, 4 Drawing Sheets

(56) References Cited

U.S. PATENT DOCUMENTS

| | | | |
|---|---|---|---|
| 7,089,585 | B1 | 8/2006 | Dharmarajan |
| 7,155,614 | B2 | 12/2006 | Ellmore |
| 7,194,764 | B2 | 3/2007 | Martherus et al. |
| 7,251,732 | B2 | 7/2007 | Jamieson et al. |
| 7,260,581 | B1 | 8/2007 | Cimini et al. |
| 7,260,838 | B2 | 8/2007 | Bones et al. |
| 7,334,254 | B1 | 2/2008 | Boydstun et al. |
| 7,346,930 | B1 | 3/2008 | Boydstun et al. |
| 7,350,229 | B1 | 3/2008 | Lander |
| 7,428,750 | B1 | 9/2008 | Dunn et al. |
| 7,496,756 | B2 | 2/2009 | Oka et al. |
| 7,496,954 | B1 | 2/2009 | Himawan et al. |
| 7,503,065 | B1 | 3/2009 | Packingham et al. |
| 7,636,852 | B1 | 12/2009 | Balasubramanian et al. |
| 7,639,794 | B2 | 12/2009 | Iwatsu et al. |
| 8,006,298 | B1 | 8/2011 | Balasubramanian et al. |
| 8,195,819 | B1 | 6/2012 | Delker et al. |
| 8,443,429 | B1 | 5/2013 | Johnson, Sr. et al. |
| 8,554,934 | B1 | 10/2013 | Delker et al. |
| 2002/0091639 | A1 | 7/2002 | Mandahl et al. |
| 2003/0120593 | A1 | 6/2003 | Bansal et al. |
| 2003/0154403 | A1 | 8/2003 | Keinsley et al. |
| 2004/0034594 | A1 | 2/2004 | Thomas et al. |
| 2004/0117386 | A1 | 6/2004 | Lavender et al. |
| 2004/0148565 | A1 | 7/2004 | Davis et al. |
| 2004/0255154 | A1 | 12/2004 | Kwan et al. |
| 2004/0260942 | A1 | 12/2004 | Jamieson et al. |
| 2004/0260953 | A1 | 12/2004 | Jamieson et al. |
| 2005/0144297 | A1* | 6/2005 | Dahlstrom et al. ........... 709/229 |
| 2005/0198501 | A1 | 9/2005 | Andreev et al. |
| 2006/0048211 | A1 | 3/2006 | Pierson et al. |
| 2006/0075224 | A1 | 4/2006 | Tao |
| 2006/0095526 | A1* | 5/2006 | Levergood et al. ........... 709/206 |
| 2007/0209065 | A1 | 9/2007 | Branam et al. |
| 2007/0250905 | A1 | 10/2007 | Clark et al. |
| 2008/0069102 | A1 | 3/2008 | Koehler et al. |
| 2008/0134307 | A1 | 6/2008 | Ashkenazi et al. |
| 2008/0184349 | A1 | 7/2008 | Ting |
| 2008/0285559 | A1 | 11/2008 | Luo et al. |
| 2010/0043065 | A1 | 2/2010 | Bray et al. |
| 2010/0050251 | A1 | 2/2010 | Speyer et al. |
| 2011/0138452 | A1 | 6/2011 | Dooley et al. |
| 2011/0239269 | A1 | 9/2011 | Wahl et al. |

OTHER PUBLICATIONS

Office Action dated Apr. 25, 2008; U.S. Appl. No. 10/960,535, filed Oct. 7, 2004.
Final Office Action dated Oct. 10, 2008; U.S. Appl. No. 10/960,535, filed Oct. 7, 2004.
Advisory Action dated Jan. 9, 2009; U.S. Appl. No. 10/960,535, filed Oct. 7, 2004.
Office Action dated Apr. 29, 2009; U.S. Appl. No. 10/960,535, filed Oct. 7, 2004.
Notice of Allowance dated Sep. 25, 2009; U.S. Appl. No. 10/960,535, filed Oct. 7, 2004.
Office Action dated Apr. 14, 2008; U.S. Appl. No. 10/994,997, filed Nov. 22, 2004.
Notice of Allowance and Fee(s) Due dated Oct. 23, 2008, U.S. Appl. No. 10/994,997, filed Nov. 22, 2004.
Office Action dated Mar. 17, 2008, U.S. Appl. No. 11/403,619, filed Apr. 13, 2006.
Final Office Action dated Oct. 6, 2008, U.S. Appl. No. 11/403,619, filed Apr. 13, 2006.
Advisory Action dated Dec. 31, 2008, U.S. Appl. No. 11/403,619, filed Apr. 13, 2006.
Office Action dated Jun. 9, 2009, U.S. Appl. No. 11/403,619, filed Apr. 13, 2006.
Final Office Action dated Jan. 6, 2010, U.S. Appl. No. 11/403,619, filed Apr. 13, 2006.
Advisory Action dated Mar. 23, 2010, U.S. Appl. No. 11/403,619, filed Apr. 13, 2006.
Office Action dated Jul. 22, 2010, U.S. Appl. No. 11/403,619, filed Apr. 13, 2006.
Final Office Action dated Jan. 6, 2011; U.S. Appl. No. 11/403,619, filed Apr. 13, 2006.
Advisory Action dated Mar. 15, 2011, U.S. Appl. No. 11/403,619, filed Apr. 13, 2006.
Examiner's Answer dated Aug. 23, 2011, U.S. Appl. No. 11/403,619, filed Apr. 13, 2006.
Second Examiner's Answer dated Nov. 21, 2011, U.S. Appl. No. 11/403,619, filed Apr. 13, 2006.
Decision on Appeal dated Dec. 17, 2014, U.S. Appl. No. 11/403,619, filed Apr. 13, 2006.
Office Action dated Apr. 6. 2010, U.S. Appl. No. 11/484,420, filed Jul. 11, 2006 13 pages.
Office Action dated Oct. 28, 2010, U.S. Appl. No. 11/484,420, filed Jul. 11, 2006.
Notice of Allowance dated Apr. 14, 2011, U.S. Appl. No, 11/484,420, filed Jul. 11, 2006.
Office Action-Restriction dated Feb. 24, 2011, U.S. Appl. No. 12/502,227, filed Jul. 13, 2009.
Office Action dated May 3, 2011, U.S. Appl. No. 12/502,227, filed Jul. 13, 2009.
Final Office Action dated Oct. 11, 2011, U.S. Appl. No. 12/502,227, filed Jul. 13, 2009.
Advisory Action dated Dec. 13, 2011, U.S. Appl. No. 12/502,227, filed Jul. 13, 2009.
Notice of Allowance dated Jan. 20, 2012, U.S. Appl. No. 12/502,227, filed Jul. 13, 2009.
FAIPP Pre-Interview Communication dated Feb. 27, 2013, U.S. Appl. No. 13/429,320, filed Mar. 24, 2012.
First Action Interview Office Action dated Apr. 12, 2013, U.S. Appl. No. 13/429,320, filed Mar. 24, 2012.
Notice of Allowance dated May 29, 2013, U.S. Appl. No. 13/429,320, filed Mar. 24, 2012.
FAIPP Pre-Interview Communication dated Oct. 24, 2012, U.S. Appl. No. 12/786,277, filed May 24, 2010.
Notice of Allowance dated Jan. 17, 2013, U.S. Appl. No. 12/786,277, filed May 24, 2010.
Citrix Systems, Citrix MetaFrame Password Manager, Apr. 22, 2004.
Microsoft, Digital Dashboard Business Process Assessment Guide White Paper, May 2000.
Pashalidis, Andreas et al., A Taxonomy of Single Sign-on Systems, Information Security and Privacy, 2003.

\* cited by examiner

METHODS AND SYSTEMS OF USING SINGLE SIGN-ON FOR IDENTIFICATION FOR A WEB SERVER NOT INTEGRATED WITH AN ENTERPRISE NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Single sign on is a function of access control of multiple related, but independent software systems. With this property a user may log in once and gains access to multiple systems and/or applications without being prompted to log in again at each of them. As different applications and resources support different authentication mechanisms, single sign on internally translates to and stores different credentials compared to what is used for initial authentication.

SUMMARY

In an embodiment, a method for accessing an application server within an enterprise network is disclosed. The method comprises retrieving, by an authentication system, an authentication message comprising a user name, wherein the authentication system is associated with the application server. The method further comprises determining, by the authentication system, that a login account is not stored in a data store of the authentication system, wherein the login account is associated with a user identification and comprises a user name that matches the user name of the authentication message. The method also comprises retrieving, by the authentication system, a login account from a user data store to generate a login account in the data store associated with the authentication system, wherein the login account is associated with the user name. The method comprises authenticating, by the authentication system, the user name with the login account. The method further comprises providing, by the authentication system, to a user associated with the user name, access based on the authentication to the project server.

In an embodiment, a system for accessing an application server within an enterprise network is disclosed. The system comprises a terminal computer comprising a browser. The system further comprises a user data store comprising one or more login accounts comprising a user name and encrypted password. The system also comprises a server storing one or more project applications, wherein the server is accessed by the terminal via the enterprise network. The system comprises an authentication system comprising a data store, wherein the data store is configured to store one or more login accounts. The authentication system is configured to retrieve an authentication message comprising a user name, wherein the authentication system is associated with the server. The authentication system is also configured to determine that a login account is not stored in the data store of the authentication system, wherein the login account is associated with a user identification and comprises a user name that matches the user name of the authentication message. The authentication system is configured to retrieve a login account from the user data store to generate a login account in the data store, wherein the login account is associated with the user name. The authentication system is further configured to authenticate the user name. The authentication system is also configured to provide to a user associated with the user name, access based on the authentication to the server.

In an embodiment, a method of tracking the use of an application on a server within an enterprise network is disclosed. The method comprises retrieving, by an authentication system, an authentication message, the authentication message comprising a user name, wherein the authentication system is associated with an application of a plurality of applications on at least one server, wherein each of the plurality of applications is associated with a different authentication system. The method further comprises determining, by the authentication system, that a login account is not stored in a data store of the authentication system, wherein the login account is associated with a user identification and comprises a user name that matches the user name of the authentication message. The method also comprises retrieving, by the authentication system, a login account from a user data store to generate a login account in the data store of the authentication system, wherein the login account is associated with the user name. The method comprises authenticating, by the authentication system, the user name with the login account, wherein authenticating comprises achieving a successful access attempt. The method further comprises recording, by the authentication system, one or more application data points, wherein the one or more data points are associated with at least successful access attempts.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
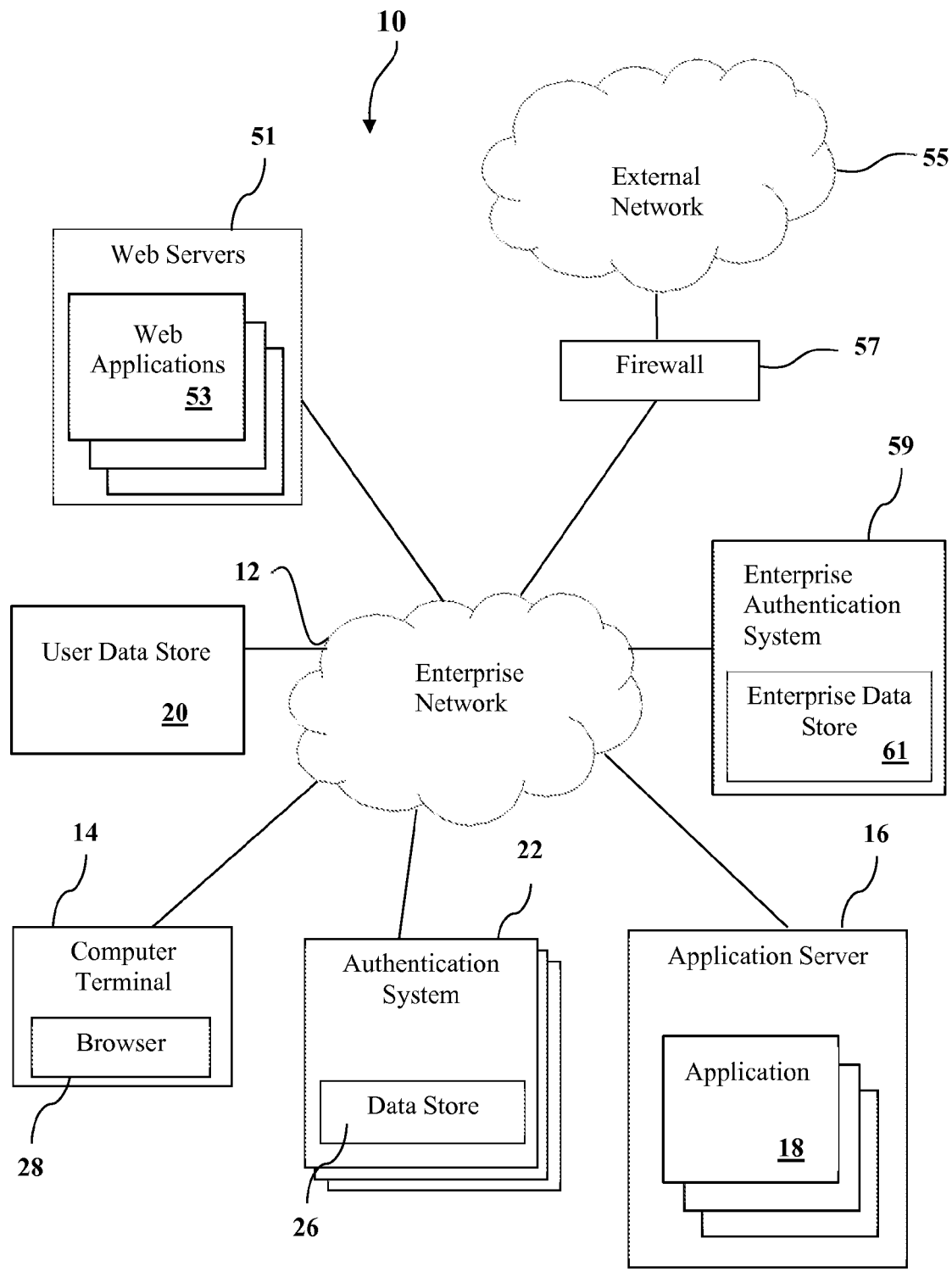
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for accessing a server in an enterprise network, where the server is not integrated into the main enterprise single sign-on access control system, while providing users a single sign-on experience is described. An application server and/or an application stored on an application server may be within the enterprise network (i.e. behind one or more firewalls protecting the enterprise network) but may not be fully integrated with the single sign-on access control functionality provided by the enterprise network, for example, because a developer of the application may be testing the application to identify user interest in the application.

The developer may desire to tweak and/or modify the application before fully integrating it with the single sign-on access control functionality provided by the enterprise network. Thus, in order to access an application server and/or an application on the enterprise network, even though the application server and/or application is not fully integrated, a user name and password may be required to gain access and/or obtain content. However, the developers of an application may not want to inconvenience users utilizing the enterprise network with an additional sign-in to access their application when users have already logged in once and expect to have a single sign on experience. This kind of extra burden to access the application may reduce the willingness of users to experiment with and socialize the new system.

An authentication system associated with at least one application and/or application server may authenticate during a content request at least a user name provided, for example, when the user initially logged into the enterprise network from a computer terminal. Thus, a user on the enterprise network may seamlessly access content from an application server and/or application while satisfying login requirements even though the application server is not integrated with the enterprise network.

The system may use one or more authentication systems to retrieve an authentication message sent from a browser of a computer terminal and intended to be transmitted to an application server and/or one or more applications stored on an application server. The authentication message may comprise a user name associated with a user logged into the computer terminal. The authentication system may determine whether a login account stored in a data store which has a user name matches at least the user name provided in the authentication message. If the user name provided in the authentication message matches a user name in a login account stored in the data store, the authentication system may permit a browser (i.e. a user utilizing a browser) to access and/or obtain content and/or application functionality from the application server and/or one or more applications stored on an application server.

However, if the user name provided in the authentication message does not match a user name in a login account stored in the data store, the authentication system may retrieve a login account from a user data store which may be a replica of the data store which stores login accounts used to authenticate access the enterprise network. The authentication system may locate the login account in the user data store which has at least a user name which matches the user name provided in the authentication message. The authentication system may generate a copy of that login account and store that login account in the data store. The authentication system may authenticate the user name provided in the authentication message with the user name of the login account stored in the data store and provide access to and/or permit a browser to obtain content from the one or more application servers and/or application associated with the pilot authentication system.

The authentication system may use the authenticated user name to identify which particular users are using application servers and/or applications. The authentication system may record which users access which applications, for example, as well as what time they are accessing the applications (i.e. data points). Additionally, the pilot authentication may record the total time one or more users access the one or more applications. The authentication system may generate one or more metrics based on the recorded data points and provide those metrics on a display for a pilot project developer.

Turning now to FIG. 1, a system 10 for accessing an application server within an enterprise network is described. The system 10 comprises an enterprise network 12, a computer terminal 14, one or more application servers 16 comprising one or more applications 18, a user data store 20, and one or more authentication systems 22. In an embodiment, the system 10 may further comprise a plurality of web servers 51 storing one or more web applications 53. Unlike the application server 16 and the applications 18, the web servers 51 and the web applications 53 stored on the web servers 51 may be fully integrated with single sign-on access control functionality of the enterprise network 12. Thus, once a user is signed into the enterprise network 12 using a browser 28 of the computer terminal 14, the user is not prompted to sign-in a second time to access the web server 51 and/or one or more web applications 53 stored on the web server 51. Additionally, the system 10 may further comprise an enterprise authentication system 59 comprising an enterprise data store 61. The enterprise network 12 may support multiple systems, such as web servers 51 and/or web applications 53 on web servers 51, but are not required to support every system, such as the application server 16, the application 18 on the application server 16, and/or the authentication system 22.

The computer terminal 14, the application servers 16 comprising one or more applications 18, the user data store 20, and the one or more authentication system 22 may be in communication with each other via the enterprise network 12. The enterprise network 12 is coupled to the external network 55 via the firewall 57. The firewall 57 is used to protect the enterprise network 12 from unauthorized access while permitting legitimate data communications to pass. While a single firewall 57 is illustrated in FIG. 1, it is understood that the system 10 may comprise a plurality of firewalls 57. In an embodiment, the enterprise authentication system 59 comprising the enterprise data store 61 as well as web servers 51 comprising the one or more web applications 53 may be in communication with the previously mentioned components via the enterprise network 12. It should be understood that the computer terminal 14, the application servers 16 comprising one or more applications 18, the user data store 20, the one or more authentication systems 22, and the enterprise network 12 may be implemented on one or more general purpose computers. Computer and computer systems are described herein after.

Enterprise networks may be configured to restrict access to the enterprise network to employees and/or other authorized individuals thereby preventing unauthorized entities from accessing the enterprise network. A user identification may be created, and a login account associating the user identification with a user name and password may be stored in a data store, such as an enterprise data store 61 of an enterprise authentication system 59. For example, an IT service department managing the enterprise network 12 of a company may provide user identification to an individual, for example identifying the individual as an employee of the company. A login account may be created by the IT service department associating the user identification with a user name and password generated, for example by the IT service department and/or the employee. An enterprise data store 61 of an enterprise authentication system 59 associated with enterprise network 12 may store the login account of a plurality of login accounts so that when a user enters their user name and password, the enterprise data store 61 may be accessed to authenticate the entered user name and password with the user name and password of the login account associated with a user identification. Authenticating the user name and password with the user identification login account may provide the user, such as the employee, access to the enterprise network 12.

In an embodiment, the stored user identifications are based on data obtained during an interactive logon process and comprise a user name and a password. A user having an account on a computer terminal 14 would typically go through the interactive logon process to access their account when starting up the computer terminal 14 or starting a computing session by providing a user name and password. The operating system, for example Microsoft Windows®, stores these credentials until the user logs off of the computer terminal 14, and these user authentication credentials may be used to support single sign on. In an embodiment, the user authentication credentials may be retrieved by the browser 28 using the NT LAN Manager (NTLM) protocol. NT LAN Manager is a MICROSOFT security protocol that provides authentication to users. The browser 28 may use the NT LAN Manager protocol to retrieve the stored user authentication credentials to pass to the authentication server 22. In an embodiment, another tool known by those of skill in the art may be used by the browser 28 to retrieve the user authentication credentials.

The computer terminal 14 comprises at least one browser 28. The browser 28 may be used for retrieving and presenting information, for example, from a web server such as web server 51, and/or a particular application, such as one of the one or more applications 18 on the application server 16, stored on a data communication network, such as the enterprise network 12. The browser 28 utilizes a uniform resource locator (URL) to identify the information, which may be in the form of a web page, image, video, or application. The browser 28 may be configured to group sites based on certain conditions, including whether a site is hosted on the external network 55 or the enterprise network 12, and to apply security restrictions for each grouping.

In an embodiment, the browser 28 may be configured to communicate with an application of a plurality of applications such as web applications 53 stored on one of the web servers 51. Additionally, the browser 28 may be configured to communicate with one or more applications 18 on an application server, such as application server 16. For example, browser 28 may be configured to transmit an anonymous http request to access and/or receive content from the web application 53 stored on the web server 51 and/or the application 18 stored on an application server 16. The browser 28 may also be configured to receive a response to the anonymous http request that access to content from an web application 53 stored on a web server 51 and/or access to content from an application 18 stored on an application server 16 is unauthorized. The response to the anonymous http request may be sent from web application 53, a web server 51, project pilot applications 18, and/or an application server 16. In an embodiment, the browser 28 may be configured to transmit authentication protocol requests comprising authentication protocols supported by a web application 53 and/or an application 18. The browser 28 may also be configured to receive an authentication request response, for example from an web application 53 and/or an application 18, where the authentication response may comprise a randomly generated key. The browser 28 may also be configured to transmit an authentication message, for example to a web application 53 and/or an application 18, where the authentication message comprises a user name and encrypted password with the randomly generated key. As will be explained further herein, in response to receiving the authentication message, the browser 28 and/or the computer terminal 14 may receive content from an web application 53 and/or an application 18.

The application servers 16 may host one or more applications 18 over the enterprise network 12. The applications 18 may be applications which a developer desires to test with users who use the enterprise network 12, but doesn't want to fully integrate with the enterprise network 12. For example, the subject applications 18 may not have been fully tested and/or certified and hence have not been admitted to full integration with the enterprise network 12. In an embodiment, full integration may comprise configuring one or more application with other applications and/or web servers on an enterprise network 12. For example, a developer may have developed a new accounting program. However, the developer wants to test and tweak the program to determine how, if, and/or which users operating on the enterprise network 12 use the new accounting program. The developer may desire to perform these tests before fully integrating the program with enterprise network 12 because after full integration, the new accounting program may be more difficult to modify and/or remove from the enterprise network 12. The developer may install the new accounting program on the application server 16 so that a user may seamlessly access the new accounting program through the enterprise network 12 even though the new accounting program is not fully integrated with the enterprise network 12.

The authentication system 22 may provide a gateway from the enterprise network 12 to the application server 16 and/or one or more applications 18. In an embodiment, the authentication system 22 may be located at or installed as a client on the computer terminal 14, at or installed as a client on the application servers 16, and/or at or installed as a client on a particular application 18. An authentication system 22 may be assigned to one application server 16 such that each one of a plurality of application servers 16 may have an authentication system 22. An authentication system 22 may be assigned to one application 18 such that each one of a plurality of applications 18 may have an authentication system 22.

The authentication system 22 comprises a data store 26. The authentication system 22 uses the data store 26 to identify particular users of an application server 16 and/or a pilot projection application 18. The data store 26 stores login accounts comprising user identification such as user names which may be used to authenticate user names from authentication messages.

In an embodiment, the data store 26 may acquire login accounts from a user data store such as user data store 20. For example, as previously mentioned a developer may have installed a new accounting program for user testing on an application server 16. A user may have logged into an enterprise network 12 via computer terminal 14. While logging into the enterprise network 12, the user may have provided a user name and password to, for example, the enterprise authentication system 59. The enterprise authentication system 59 may access an enterprise data store 61. The enterprise data store 61 may store a plurality of login accounts with user identifications such as a user name and password. The enterprise authentication system 59 may match a user name and a user password provided by a user at the computer terminal 14 with a user name and password of a login account in the enterprise data store 61. Matching the provided user name and password with a user name and password of a login account stored on the enterprise data store 61 may allow a user access to the enterprise network 12. After providing access to the enterprise network 12, the enterprise authentication system 61 may transmit the login account user identification comprising the user's user name and password (now encrypted) to a user data store 20, for example, backing-up storage of login accounts.

Although FIG. 1 depicts that the user data store 20 is located as a stand-alone entity within the enterprise network 12, in an embodiment, the user data store 20 may be located within the computer terminal 14 and store at least the user name and encrypted password of a user while the user is logged into the enterprise network 12. The user data store 20 may be a replica of one or more login accounts from the enterprise data store 61, except that the user data store 20 may be more easily accessed because it is not used for enterprise network authentication purposes. Additionally, while the user data store 20 may comprise a replica of one or more login accounts of the enterprise data store 61, the user data store 20 may store an encrypted user password instead of the actual (i.e. unencrypted) password, which, for example, may be used only to verify that a user has been logged into the enterprise network 12 without providing how a user logged into the enterprise network 12.

Once logged into the enterprise network 12, a user at computer terminal 14 may use browser 28 to access or retrieve content from an application on a web server that happens to be an application 18 on an application server 16. After a series of communications, as previously disclosed and unseen by the user, the browser 28 may provide an authentication message directed to the application 18. In an embodiment, the authentication system 22 may detect that the authentication message is directed to the application server 16 and/or the application 18 and intercept the authentication message before the authentication message is received by the application server 16 and/or the application 18.

Regardless of how the authentication system 22 retrieves an authentication message, the authentication system 22 may be configured to retrieve an authentication message directed to an application server 16 and/or an application 18 associated with the authentication system 22. Generally, the authentication message may comprise a user name and an encrypted password. The encrypted password may comprise a randomly generated key, for example, transmitted by the application 18 in response to an authentication request. The authentication system 22 may further be configured to determine whether a login account stored in the data store 26 is associated with a user identification comprising a user name that matches at least the user name provided in the authentication message. In an embodiment, the authentication system 22 may receive only a user name and thus may generate a generic password either specific for a particular user name or general for every user name. The authentication system 22 may also verify that the authentication message also comprises the randomly generated key. If the authentication system 22 determines that the data store 26 has a login account with at least a user name that matches the user name of the authentication message, the authentication system 22 may provide access to the application server 16 and/or the application 18. For example, in response to authenticating the user name with authentication system 22, an application 18 may provide content to the computer terminal 14. However, if the authentication system 22 determines that the data store 26 does not have a login account with at least a user name that matches the user name of the authentication message, the authentication system 22 may retrieve a login account comprising at least the user name of the authentication message from the user data store 20. For example, the authentication system 22 may search through login accounts stored in the user data store 26 in order to match at least a user name of one of the login accounts with the user name provided in the authentication message. If the authentication system 22 does not find a login account with at least a user name that matches the user name provided in the authentication message, the authentication system 22 may deny the browser 28 which generated the authentication message access to the application server 16 and/or an application 18. In an embodiment, if the authentication system 22 does not find a login account with at least a user name that matches the user name provided in the authentication message, the authentication system 22 may deny access to the application server 16 and/or an application 18. The authentication system 22 may also notify a developer and/or an administrator of the application server 16 and/or an application 18 in response to denying access. The authentication system 22 may, for example, sound an alarm and/or transmit a message to a developer in response to denying access.

In an embodiment, if the authentication system 22 finds a login account in the user data store 26 with at least user name that matches the user name provided in the authentication message, the authentication system 22 may generate a copy and/or store the login account from the user data store 20 into the data store 26. In an embodiment, the authentication system 22 may also generate a password specific to a particular user name or a generic to all user names for the current login attempt as well as subsequent login attempts. Regardless, by storing a copy of the login account from the user data store 20 in the data store 26, the authentication system 22 may avoid accessing the user data store 20 a second time if the user decides to access and/or obtain content from an application 18 associated with the authentication system 22 a second time.

The authentication system 22 may also be configured to authenticate the user name and encrypted password of the authentication message with a user name and encrypted password of the login account. For example, the authentication system 22 may authenticate the user name and encrypted password of the authentication message with at least the user name of the login account stored in the data store. The authentication system 22 may use the matched user names to determine exactly which user is attempting access to a particular application 18. The authentication system 22 may identify that the authentication message has an encrypted password in order to at least verify that the user has been authenticated by the enterprise authentication system 59. Once an authentication message is authenticated by the authentication system 22, a user may access (i.e. attained a successful access attempt) an application server 16 and/or a particular application 18 stored on the application server 16. For example, the application 18 may provide content to computer terminal 14.

The authentication system 22 may also be configured to record that a user accessed a particular application 18 and/or an application server 16, for example, at a particular time. In an embodiment, the authentication system 22 may record the duration that one or more users access a particular application 18 and/or an application server 16. The authentication system 22 may record successful access attempt to gather data points to generate metrics which may be examined by developers of particular applications 18.

Figure 2:
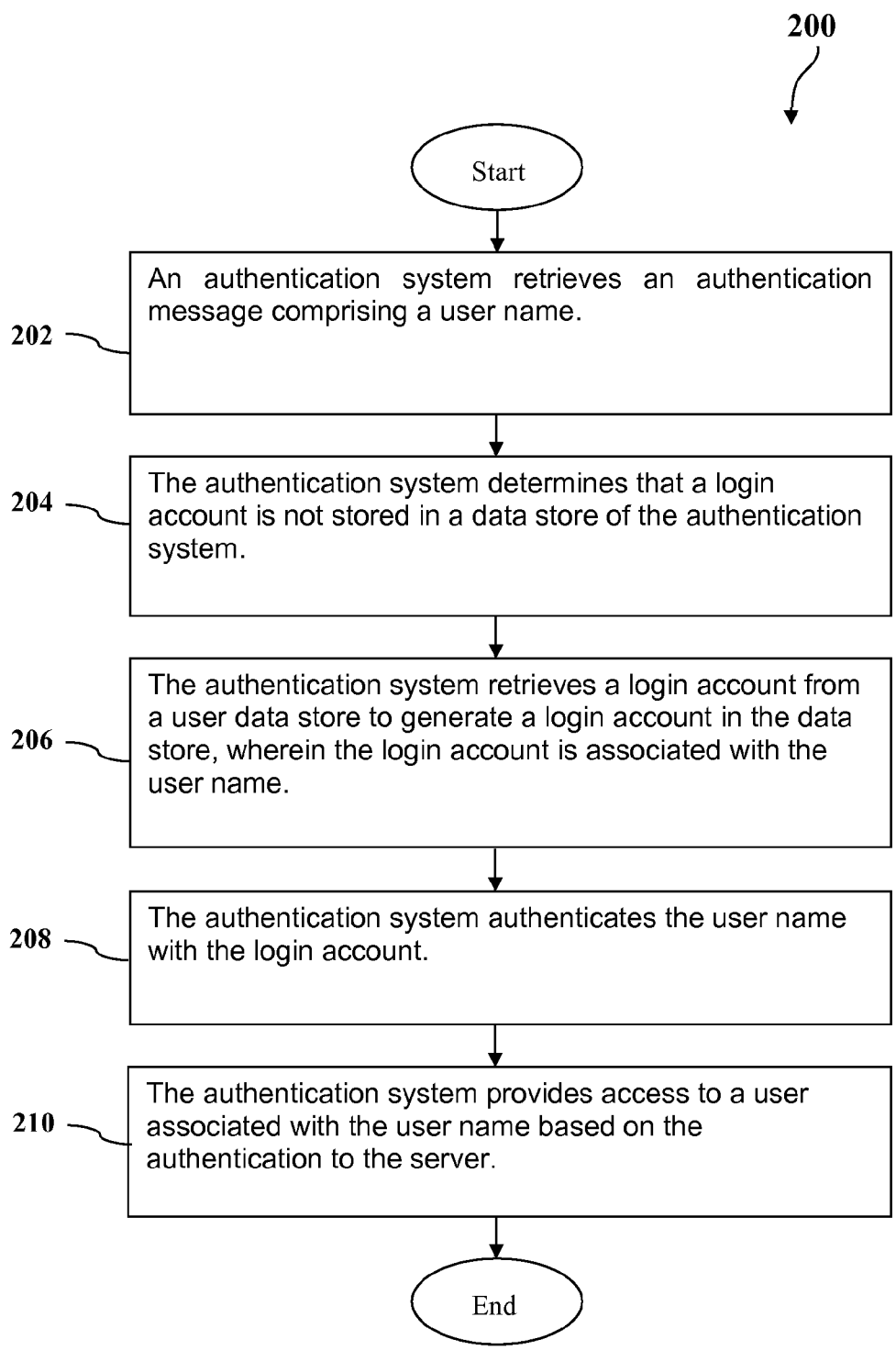
FIG. 2 is a flow chart of a method according to an embodiment of the disclosure.

Turning now to FIG. 2, a method 200 for accessing an application server 16 within an enterprise network 12 is described. In an embodiment, a computer terminal 14, may be required to access an enterprise network 12 before being able to access the application server 16 and/or an application 18 stored on an application server 16 within the enterprise network 12. For example, as previously disclosed, a user may be assigned a user name and password that allows the user to access the enterprise network 12. The user may enter their user name and password at the computer terminal 14 which allows the user to access the enterprise network 12. Once having access to the enterprise network 12, the user may attempt to access a web server 51 on the enterprise network 12. In an embodiment, the web server 51 may be a central web server for the enterprise network 12, where the central web server provides access to other web servers 51 including application servers 16. The central web server may comprise a node, gateway, and/or bus which provides access to one or more web servers 51 on the enterprise network 12. Alternatively, the web server may be an application server 16. The computer terminal 14 may attempt to access an application server 16 using a browser 28.

The browser 28 may access a web server 51 using an NTLM Protocol Primer or a similar system. For example, a web server 51 (e.g. a node at the web server 51) may receive an anonymous http request, for example from the browser 28. The anonymous http request may be without a user name and password. Because the anonymous http request is without a user name and password, the web server 51 may send a response to the anonymous http request indicating that the request is unauthorized. In an embodiment, the response to the anonymous http request may comprise a "challenge" response. Upon receiving the response to the anonymous http request, the browser 28 may send an authentication protocols request to the web server 51 comprising authentication protocols supported by the web server 51. In an embodiment, the authentication protocols request may comprise a "negotiate" request. Based on receiving the authentication protocols request comprising the authentication protocols supported by the web server 51, the web server 51 may send a response to the authentication protocols request comprising a randomly generated key to the browser 28. In an embodiment, the response to the authentication protocols request comprising a randomly generated key may comprise another "challenge" request. In response to receiving the response to the authentication protocols request comprising a randomly generated key, the browser 28 may send an authentication message to the web server 51. The authentication message may comprise the user name provided when the user logged into the enterprise network 12 and an encrypted password based on the password given when the user logged into the enterprise network 12 along with the randomly generated key to validate the authentication message. For a typical web server 51 on the enterprise network 12, receiving the authentication message with the user name and the encrypted password with the randomly generated key would authenticate the browser 28 to access the web server 51. For example, the web server 51 may send the requested content to the browser 28 based on receiving the authentication message.

However, the web server 51 may be an application server 16. As previously disclosed, the application server 16 may not be fully integrated with enterprise network 12 so that an additional login is requested. An authentication system 22 (e.g. a custom http module) associated with the application server 16 may provide for a second login into the application server 16 without requesting that the user reenter the previously entered user name and password to access the enterprise network 12 or a different user name and password. At block 202, an authentication system 22 associated with the application server 16 may retrieve the authentication message. As previously disclosed the authentication message may comprise a user name. In an embodiment, retrieving an authentication message may comprise detecting that the authentication message is to be sent to the application server 16. For example, the authentication system 22 may be monitoring communication between web servers 51 and/or application servers 16 and browsers 28. The authentication system 22 may detect that a particular communication transmission is an authentication message transmitting to an application server 16. The authentication system 22 may intercept the authentication message before the authentication message is received by the application server 16, for example, to identify the particular user requesting content from the application server 16.

Upon retrieving the authentication message, the authentication system 22 may access a data store 26 of the authentication system 22 and determine if a login account associated with a user identification comprising at least a matching user name is stored on the data store 26. The data store 26 may comprise a plurality of login accounts associated with user identifications. For example, a plurality of login accounts associated with a plurality of user identifications may have previously been installed in the data store 26. When the authentication message is retrieved, the authentication system 22 may determine that the user name transmitted in the authentication message (i.e. the user name provided during the login to the enterprise network 12) matches the user name of a login account stored in the data store 26. Once the authentication system 22 matches the two user names, the authentication system 22 may provide the user associated with the login account access to the application server 16. In an embodiment, the authentication system 22 may permit the application server 16 to provided content from one or more applications 18.

At block 204, the authentication system 22 may determine that a login account associated with the user name of the authentication message is not stored in the data store 26 of the authentication system 22. For example, the authentication system 22 may determine that no login account comprising a user name which matches the user name transmitted in the authentication message exists in the data store 26. In an embodiment, the authentication system 22 may examine the user name and an encrypted password of login accounts in the data store 26 and determine that no login account in the data store 26 exists that matches the user name and encrypted password of the authentication message.

At block 206, the authentication system 22 may access a user data store 20 to retrieve a login account with a user name that matches the user name provided in the authentication message. For example, the enterprise data store 61 of the enterprise authentication system 59 may be operating with a system that generates a user data store 20. The user data store 20 may be a replica of the enterprise data store 61 but without the security associated with the enterprise data store 61 because the user data store 20 is not accessed to authenticate, for example, user information (e.g. a user name and a user password) for accessing the enterprise network 12. The authentication system 22 may match the user name provided in the authentication message with a user name of a login account in the user data store 20. In an embodiment, the authentication system 22 may not locate a user name in the user data store which matches the user name provided in the authentication message. In this embodiment, the authentication system 22 may deny access to the application server 16 and/or notify an administrator such as a developer and/or an IT administrator that a login account in the user data store 20 does not have a user name which matches the user name provided in the authentication message.

Upon matching the two user names, the authentication system 22 may retrieve and/or copy the user identification from the login account comprising the matched user name from the user data store and generate a login account for storage in the data store 26 of the authentication system 22. In an embodiment, the authentication system 22 may store the newly generated login account so that if the application server 16 is accessed a second time with an authentication message comprising the same user name, the authentication system 22 may not have to access the user data store 20 again to retrieve the same login account to authenticate the user name. In an embodiment, the authentication system 22 may generate a password. The password may comprise a generic password which may be the same password assigned to every user name stored in the data store 26. The password may be a password specific to a particular user name.

At block 208, the authentication system 22 may authenticate the user name with the login account stored in the data store 26 of the application server 22 which has a user name which matches the user name provided in the authentication message. In an embodiment, the authentication system 22 may also authenticate that the authentication message has the encrypted password to provide some assurance that the authentication message originates from a source (e.g. browser 28) previously authenticated by the enterprise authentication system 59. The encrypted password may be the same encrypted password for each user name. Alternatively, in an embodiment, the encrypted password may be different for each user name.

Furthermore, in an embodiment, the authentication system 22 may also authenticate the randomly generated key. For example, after the application server 16 generates the randomly generated key, the application server 16 may transmit the same randomly generated key to the authentication system 22. Thus, when the authentication system 22 receives the randomly generated key, the authentication system 22 may further authenticate the browser 28 requesting access to the application server 16. Alternatively, the application 18 or the application server 16 may authenticate the randomly generated key.

Upon authenticating the user name with the login account, at block 210, the authentication system 22 may provide the browser 28 access to the application server 16 and one or more applications 18 stored on the application server 16. For example, the authentication system 22 may permit the application server 16 to provide content from one or more applications 18.

Figure 3:
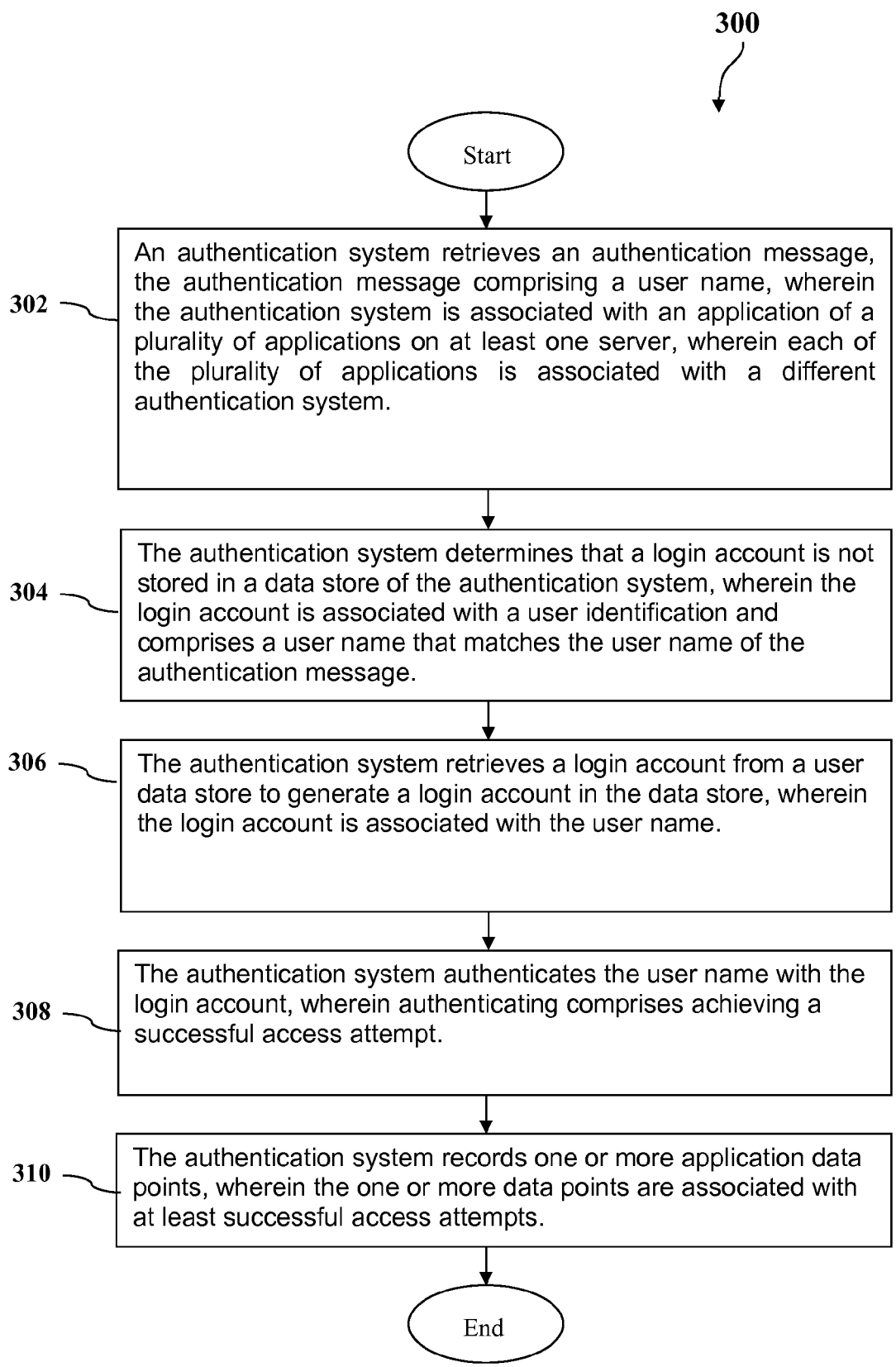
FIG. 3 is a flow chart of a method according to an embodiment of the disclosure.

Turning to FIG. 3, a method 300 for tracking the use of an application 18 on an application server 16 within an enterprise network 12 is disclosed. As previously disclosed, a user may be assigned a user name and password that allows the user to access the enterprise network 12. The user may enter their user name and password at a computer terminal 14 which allows the user to access the enterprise network 12. Once having access to the enterprise network 12, the user may attempt to access a web application 53 stored on a web server 51 on the enterprise network 12. In an embodiment, the user may attempt to access the application 18 stored on the application server 16. The computer terminal 14 may attempt to access an application 18 using the browser 28. The browser 28 may attempt to access an application 18 using an NTLM Protocol Primer or a similar system.

Similar to previous embodiments, at block 302, the authentication system 22 may retrieve an authentication message generated, for example, through an NTLM Protocol Primer. The authentication message may comprise a user name and an encrypted password with a randomly generated key. In an embodiment, the authentication system 22 may be associated with only a single application 18 of a plurality of applications 18 stored on at least one application server 16. Thus, each application 18 of the plurality of applications 18 is associated with a different authentication system 22. Providing an authentication system 22 for each application 18 may allow each authentication system 22, for example, to collect one or more application data points, as will be discussed further herein.

Retrieving an authentication message may comprise detecting that the authentication message is to be sent to a particular application 18. For example, the authentication system 22 may be monitoring communication between web servers 51 and/or applications 18 and browsers 28. The authentication system 22 may detect that a particular communication transmission is an authentication message transmitting to a particular application 18 associated with the authentication system 22. The authentication system 22 may intercept the authentication message before the authentication message is received by the application 18, for example, to identify the particular user requesting content from the application 18.

At block 304, the authentication system 22 may determine that a login account associated with the user name of the authentication message is not stored in the data store 26 of the authentication system 22. For example, the authentication system 22 may determine that no login account comprising a user name which matches the user name transmitted in the authentication message exists in the data store 26. At block 306, the authentication system may access a user data store 20 to retrieve a user identification login account with a user name that matches the user name provided in the authentication message. Upon matching the two user names, the authentication system 22 may retrieve and/or copy the user identification from the login account comprising the matched user name from the user data store and generate a login account for storage in the data store 26 of the authentication system 22.

At block 308, the authentication system 22 may authenticate the user name with the login account retrieved from the user data store 20 and/or stored in the data store 26. Upon authenticating the user name with the login account, the authentication system 22 may provide the browser 28 access to the application 18 stored on the application server 16. This access may be considered a successful access attempt. Thus, because the data store 26 of the authentication system 22 has stored a login account with a user name that matches the user name of the authentication message, the browser 28 and ultimately the user at the computer terminal 14 may have achieved a successful access attempt. For example, the authentication system 22 may permit the application 18 to provide content to the browser 28.

At block 310, the authentication system 22 may record one or more application data points. In an embodiment, the application data points may be associated with successful access attempts. The authentication system may record how many successful access attempts have been made to a particular application 18. The amount of successful access attempts to access content from a particular application 18 may provide an indication of how popular and/or useful that particular application 18 is, for example, to company employees. The authentication system 22 may record how many successful access attempts have been made using a particular user name to a particular application 18. By identifying particular users who frequently use a particular application 18 or seldom use a particular application 18, application 18 may be tailored to better accommodate users who often use the application and/or to attract users who previously infrequently used the application 18. The authentication system 22 may also record when successful access attempts have been made. Recording the time of a successful access attempt may indicate which features of the application 18 are most useful. For example, a company's accounting department may perform all of research and development's accounting activities on Tuesday and Thursday mornings and all of marketing's account activities on Wednesday and Friday afternoons. Thus, by recording that a particular application geared towards accounting is used more frequently on Tuesday and Thursday mornings, the application may be tailored to better accommodate accounting activities associated with marketing. It should be understood, that data points (i.e. application server data points) may also be recorded for application servers 16 when authentication systems 22 are associated with application servers 16 storing one or more applications 18.

In an embodiment, the authentication system 22 may generate one or more application metrics based on the one or more application and/or application server data points. The application metrics may comprise at least one of the frequency that access to an application 18 is successfully attempted, the frequency that a particular user name successfully attempts access to an application 18, the total number of successful access attempts to an application 18, and the total number of successful access attempts to an application 18 by a particular user name. These metrics may provide insight to, for example, the developer(s) about how to tailor the application 18 to better accommodate the needs of the targeted users. Additionally, the application metrics may indicate that the application 18 should be removed and/or deleted.

In an embodiment, the application data points may be associated with the duration of access to a particular application 18 and/or an application server 16. For example, an authentication system 22 may detect the amount of time a browser 28 communicates with an application 18. The authentication system 22 may generate one or more application and/or application server metrics based on the detecting the duration of access time. The application and/or application server metrics may comprise at least one of a total duration of time that a particular application 18 is accessed, the total duration of time that a particular user name accesses a particular application 18, the peak time that a particular application 18 is used, and the peak time that a particular user name uses a particular application 18. These metrics may provide insight to, for example, the developer(s) about how to tailor the application 18 to better accommodate the needs of the targeted users. Additionally, the application and/or application server metrics may indicate that the application 18 should be removed and/or deleted.

Figure 4:
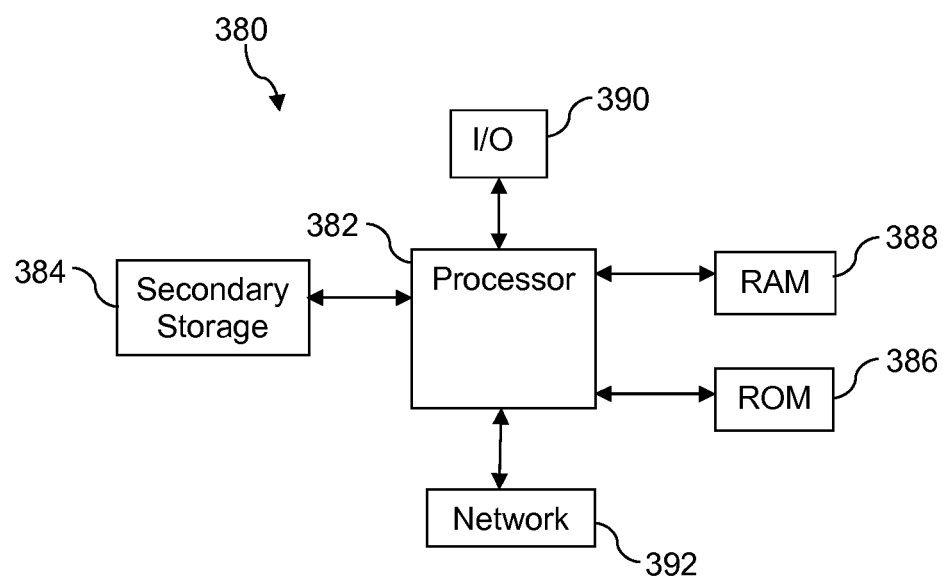
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for accessing an application on a server within an enterprise network while being protected behind a firewall, comprising:

retrieving, by an authentication system, an authentication message comprising a user name associated with a user identification for the enterprise network, the authentication message being generated by a web server sending an authentication request response comprising a randomly generated key and receiving the authentication message which comprises the user name and encrypted password with the randomly generated key to validate the authentication message, wherein the authentication message is associated with a browser that originates the authentication message subsequent to being logged into the enterprise network via the user name authorized for use on the enterprise network, and wherein the authentication system is associated with the application server having at least partial integration with the enterprise network;

based on the user name of the authentication message, determining, by the authentication system, that an application login account has not been generated for a data store of the authentication system, wherein the application login account is associated with the user identification for the enterprise network and comprises an application user name corresponding to the user name of the authentication message;

retrieving, by the authentication system from a user data store behind the firewall, an enterprise login account for the enterprise network to generate the application login account for the data store of the authentication system;

authenticating, by the authentication system, the user name with the application login account;

providing, by the authentication system, access to the application on the server within the enterprise network based on the authentication; and generating, by the authentication system, at least one application metric based on at least one application data point that is associated with access to the application on the server, the application metric comprising at least one of a frequency that access to the application is successfully attempted, a frequency that a particular user name successfully attempts access to the application, a total number of successful access attempts to the application, or a total number of successful access attempts to the application by a particular user name.

2. The method of claim 1, wherein the authentication system provides a gateway from the enterprise network to the application server, and wherein the authentication message is generated by:

receiving, by a web server, an anonymous http request to access the web server associated with the application server, wherein the anonymous http request does not provide a user name and password;

sending, by the web server, an anonymous access http request response that access to the web server is unauthorized; and receiving, by the web server, an authentication protocols request to access the web server, wherein the authentication protocols request comprises authentication protocols supported by the web server.

3. The method of claim 1, wherein retrieving comprises:

detecting, by the authentication system coupled behind the firewall of the enterprise network, that the authentication message is to be routed from within the enterprise network to the application server, the application server being protected behind the firewall; and intercepting the authentication message before the authentication message is received by the application server.

4. The method of claim 1, wherein the authentication system is coupled to a terminal that accesses the enterprise network, the terminal being associated with a browser sending the authentication message.

5. The method of claim 1, wherein the authentication system is coupled to the application server and the enterprise network while remaining behind the firewall.

6. The method of claim 1, the method further comprising recording, by the authentication system, the number of occurrences the user name is authenticated with the application login account.

7. The method of claim 1, wherein the authentication system authenticates the user name with the application login account without validating the authentication message.

8. The method of claim 1, wherein the authentication system provides access to the application server for the application login account subsequent to the authenticating and without retrieving the user identification associated with the user name from the user data store responsive to the user identification associated with the user name being stored with the application login account for the authentication system.

9. A system for accessing a server within an enterprise network is protected behind a firewall, the system comprising:

a user data store comprising a plurality of enterprise login accounts that each comprise a user name and encrypted password;

a server coupled to at least one processor and a non-transitory memory storing an application that configures the at least one processor upon execution, wherein the server is accessed by a terminal via the enterprise network, the terminal being associated with a browser that originates an authentication message subsequent to being logged into the enterprise network via a user name authorized for use on the enterprise network; and an authentication system comprising a data store having non-transitory memory, that is configured to store one or more application login accounts, wherein the authentication system is coupled to the server and configures the at least one processor to:

retrieve the authentication message comprising the user name that is associated with a user identification for the enterprise network, wherein the authentication system is associated with the application executable on the server, the authentication message being generated by a web server sending an authentication request response comprising a randomly generated key and receiving the authentication message which comprises the user name and encrypted password with the randomly generated key to validate the authentication message, determine that an application login account is not stored in the data store of the authentication system, wherein the application login account is associated with the user identification and comprises an application user name that matches the user name of the authentication message;

retrieve an enterprise login account from a user data store to generate the application login account for the data store based on the enterprise login account;

authenticate the user name with the application login account;

provide, to the terminal associated with the user name, access to the application on the server based on the authentication; and generate at least one application metric based on at least one application data point that is associated with access to the application on the server, the application metric comprising at least one of a frequency that access to the application is successfully attempted, a frequency that a particular user name successfully attempts access to the application, a total number of successful access attempts to the application, or a total number of successful access attempts to the application by a particular user name.

10. The system of claim 9, wherein the server is accessible only through the enterprise network and behind the firewall.

11. A method of tracking access of an application on a server from within an enterprise network behind a firewall, comprising:

retrieving, by an authentication system coupled to the enterprise network and the server, an authentication message that comprises a user name, wherein the authentication system is associated with the application that is among a plurality of applications coupled to the enterprise network, wherein each of the plurality of applications being associated with a different authentication system, wherein the authentication message is generated by a web server sending an authentication request response comprising a randomly generated key and receiving the authentication message which comprises the user name and encrypted password with the randomly generated key to validate the authentication message, and wherein the authentication message is associated with a browser that originates the authentication message subsequent to being logged into the enterprise network via the user name authorized for use on the enterprise network;

determining, by the authentication system, that an application login account is not stored in a data store of the authentication system, wherein the application login account is associated with a user identification of the enterprise network and comprises an application user name that matches the user name of the authentication message;

retrieving, by the authentication system, an enterprise network login account from a user data store to generate the application login account in the data store of the authentication system, wherein the enterprise network login account is associated with the user name of the authentication message;

authenticating, by the authentication system, the user name with the application login account, wherein authenticating comprises achieving a successful access attempt to the application on the server;

recording, by the authentication system, one or more application data points tare associated with each successful access attempt to the application on the server; and based on the one or more application data points, generating, by the authentication system, one or more application metrics that comprise at least one of the frequency that access to the application is successfully attempted, the frequency that a particular user name successfully attempts access to the application the total number of successful access attempts to the application, and the total number of successful access attempts to the application by a particular user name.

12. The method of claim 11, wherein the authentication message is generated by:
  receiving, by a web server, an anonymous http request to access the web server, wherein the anonymous http request does not provide a user identification and password;
  sending, by the web server, an anonymous access http request response that access to the web server is unauthorized; and
  receiving, by the web server, an authentication protocols request to access the web server, wherein the authentication protocols request comprise authentication protocols supported by the web server.

13. The method of claim 12, wherein retrieving comprises:
  detecting that the authentication message is to be sent to one of the application or the server; and
  intercepting the authentication message before the authentication message is received by the application.

14. The method of claim 11, wherein a user, logged into the enterprise network by providing an authorized user name and password corresponding to the enterprise network login account, sends the authentication message via a browser.

15. The method of claim 11, wherein the authentication system is located at a terminal associated with a browser sending the authentication message.

16. The method of claim 12, wherein the authentication system is located at the server.

17. The method of claim 11, wherein the one or more application data points comprise at least one of a count of successful access attempts, a count of successful access attempts using a particular user name, and the time associated with each successful access attempt.

18. The method of claim 11, wherein the one or more application data points further comprise duration of access to a particular application and the one or more application metrics further comprise at least one of a total duration of time that a particular application is accessed, the total duration of time that a particular user name accesses a particular application, the peak time that a particular application is used, and the peak time that a particular user name uses a particular application.

* * * * *